US011795587B2

(12) United States Patent
Bedingfield et al.

(10) Patent No.: US 11,795,587 B2
(45) Date of Patent: *Oct. 24, 2023

(54) PARTIAL FLOAT WEAVE FABRIC

(71) Applicant: Milliken & Company, Spartanburg, SC (US)

(72) Inventors: Steven L. Bedingfield, LaGrange, GA (US); Christopher G. Durham, Manchester, GA (US)

(73) Assignee: Milliken & Company, Spartanburg, SC (US)

(*) Notice: Subject to any disclaimer, the term of this patent is extended or adjusted under 35 U.S.C. 154(b) by 220 days.

This patent is subject to a terminal disclaimer.

(21) Appl. No.: 17/235,339

(22) Filed: Apr. 20, 2021

(65) Prior Publication Data

US 2021/0238776 A1 Aug. 5, 2021

Related U.S. Application Data

(63) Continuation of application No. 15/586,583, filed on May 4, 2017, now Pat. No. 11,008,680, which is a
(Continued)

(51) Int. Cl.
*D03D 13/00* (2006.01)
*D03D 15/513* (2021.01)
(Continued)

(52) U.S. Cl.
CPC ............. *D03D 13/004* (2013.01); *D03D 1/04* (2013.01); *D03D 15/513* (2021.01);
(Continued)

(58) Field of Classification Search
CPC ...... D03D 13/004; D03D 1/04; D03D 15/513; D03D 1/0043; D03D 21/00;
(Continued)

(56) References Cited

U.S. PATENT DOCUMENTS 3,911,200 A 10/1975 Simons
4,281,211 A 7/1981 Tatum
(Continued)

FOREIGN PATENT DOCUMENTS

CN 1277643 12/2000
CN 1375071 10/2002
(Continued)

OTHER PUBLICATIONS

Patent Cooperation Treaty PCT International Search Report, dated Feb. 10, 2017. International Application No. PCT/US2016/060022. International Filing Date, Nov. 2, 2015.
(Continued)

*Primary Examiner* — Robert H Muromoto, Jr.

(74) *Attorney, Agent, or Firm* — Cheryl J. Brickey

(57) ABSTRACT

An innerduct for a cable containing one or more strip-shaped lengths of woven textile fabric configured to create a flexible, longitudinal compartment for enveloping a cable. The woven fabric comprises a plurality warp yarns and a plurality of picks of weft yarns, the weft yarns contain a repeating first weft pattern of at least one monofilament yarn and optionally at least one single-inserted multifilament yarn. The woven fabric contains an alternating pattern containing first weave zones and partial float weave zones. The warp yarns in the first weave zone pass successively over and under each adjacent weft yarn and at least a portion of the warp yarns in the partial float zone float over some adjacent weft yarns.

22 Claims, 3 Drawing Sheets

Related U.S. Application Data continuation of application No. 14/950,778, filed on Nov. 24, 2015, now Pat. No. 10,254,498.

(51) Int. Cl.
| | |
|---|---|
| *D03D 1/04* | (2006.01) |
| *G02B 6/44* | (2006.01) |
| *G02B 6/50* | (2006.01) |
| *H02G 9/06* | (2006.01) |
| *D03D 15/00* | (2021.01) |

(52) U.S. Cl.
CPC ............. *G02B 6/4459* (2013.01); *G02B 6/50* (2013.01); *H02G 9/06* (2013.01)

(58) Field of Classification Search
CPC ......... D03D 2700/0166; D03D 1/0088; G02B 6/4459; G02B 6/50; H02G 9/06
See application file for complete search history.

(56) References Cited

U.S. PATENT DOCUMENTS

| | | | |
|---|---|---|---|
| 4,582,093 A | 4/1986 | Hubbard | |
| 4,602,763 A | 7/1986 | Gaylin | |
| 4,761,194 A | 8/1988 | Pithouse | |
| 4,862,922 A | 9/1989 | Kite, III | |
| 4,929,478 A | 5/1990 | Conaghan | |
| 5,016,859 A | 5/1991 | Zimmer | |
| 5,027,864 A | 7/1991 | Conti | |
| 5,442,136 A | 8/1995 | Allen | |
| 5,513,149 A | 4/1996 | Salmi | |
| 5,587,115 A | 12/1996 | Allen | |
| 5,789,711 A | 8/1998 | Gareis | |
| 5,843,542 A | 12/1998 | Brushafer | |
| 5,969,295 A | 10/1999 | Boucino | |
| 6,178,278 B1 | 1/2001 | Keller | |
| 6,251,201 B1 | 6/2001 | Allen | |
| 6,262,371 B1 | 7/2001 | Allen | |
| 6,304,698 B1 | 10/2001 | Morris | |
| 6,398,190 B1 | 6/2002 | Li | |
| 6,421,485 B2 | 7/2002 | Morris | |
| 6,471,440 B1 | 10/2002 | Scheiwiller | |
| 6,571,833 B1 | 6/2003 | McLarty, III | |
| 6,718,100 B2 | 4/2004 | Morris | |
| 6,876,797 B2 | 4/2005 | Morris | |
| 6,886,601 B2 | 5/2005 | Allen | |
| 6,963,031 B2 | 11/2005 | Gladfelter | |
| 7,078,615 B2 | 7/2006 | Gladfelter | |
| 7,085,455 B2 | 8/2006 | Morris | |
| 7,085,458 B2 | 8/2006 | Morris | |
| 7,174,074 B2 | 2/2007 | Morris | |
| 7,319,802 B2 | 1/2008 | Morris | |
| 7,512,668 B2* | 3/2009 | Koegel | G06Q 10/10 709/219 |
| 7,621,505 B2 | 11/2009 | Hamrick | |
| 7,754,971 B2 | 7/2010 | Bedingfield | |
| 7,799,997 B2 | 9/2010 | Bedingfield | |
| 7,873,028 B2* | 1/2011 | Lam | H04L 63/10 370/352 |
| 8,387,954 B2 | 3/2013 | Allen | |
| 8,809,682 B2 | 8/2014 | Hepfinger | |
| 9,577,840 B2* | 2/2017 | Lam | H04L 61/103 |
| 10,254,498 B2* | 4/2019 | Bedingfield | D03D 1/04 |
| 10,829,874 B2* | 11/2020 | Bedingfield | D03D 13/004 |
| 11,008,680 B2* | 5/2021 | Bedingfield | D03D 1/04 |
| 2003/0015248 A1 | 1/2003 | Itoh | |
| 2003/0123824 A1 | 7/2003 | Tatarka | |
| 2003/0142933 A1 | 7/2003 | Morris | |
| 2003/0183291 A1 | 10/2003 | Allen | |
| 2003/0185527 A1 | 10/2003 | Morris | |
| 2004/0033035 A1 | 2/2004 | Morris | |
| 2004/0081411 A1 | 4/2004 | Gladfelter | |
| 2005/0047735 A1 | 3/2005 | Morris | |
| 2005/0185902 A1 | 8/2005 | James | |
| 2006/0016507 A1 | 1/2006 | Baer | |
| 2006/0117807 A1 | 6/2006 | Reiter | |
| 2008/0054236 A1 | 3/2008 | Morris | |
| 2008/0264669 A1 | 10/2008 | Bedingfield | |
| 2009/0218002 A1 | 9/2009 | Kashihara | |
| 2012/0073854 A1 | 3/2012 | Allen | |
| 2012/0132309 A1 | 5/2012 | Morris | |
| 2012/0187271 A1 | 7/2012 | Komiya | |
| 2017/0145603 A1 | 5/2017 | Bedingfield | |

FOREIGN PATENT DOCUMENTS

| | | |
|---|---|---|
| CN | 1679120 | 10/2005 |
| CN | 101548216 | 9/2009 |
| CN | 102007239 | 4/2011 |
| CN | 102560802 | 7/2012 |
| CN | 102611045 | 7/2012 |
| CN | 106995969 | 8/2017 |
| CN | 206502927 | 9/2017 |
| CN | 211151396 | 7/2020 |
| DE | 10204019 | 8/2003 |
| DE | 102012100359 | 7/2012 |
| EP | 0045212 | 4/1984 |
| EP | 0225152 A2 | 6/1987 |
| EP | 1254980 | 11/2002 |
| EP | 1385246 | 1/2004 |
| GB | 2084505 | 5/1984 |
| JP | 2005116534 | 4/2005 |
| KR | 200473979 | 8/2014 |
| WO | 2004020888 | 3/2004 |
| WO | 2008027467 | 3/2008 |
| WO | 2008070819 | 6/2008 |
| WO | 2010015872 A1 | 2/2010 |

OTHER PUBLICATIONS

Patent Cooperation Treaty PCT International Search Report, dated Feb. 24, 2020. International Application No. PCT/US2019/060112. International Filing Date: Nov. 6, 2019.

* cited by examiner

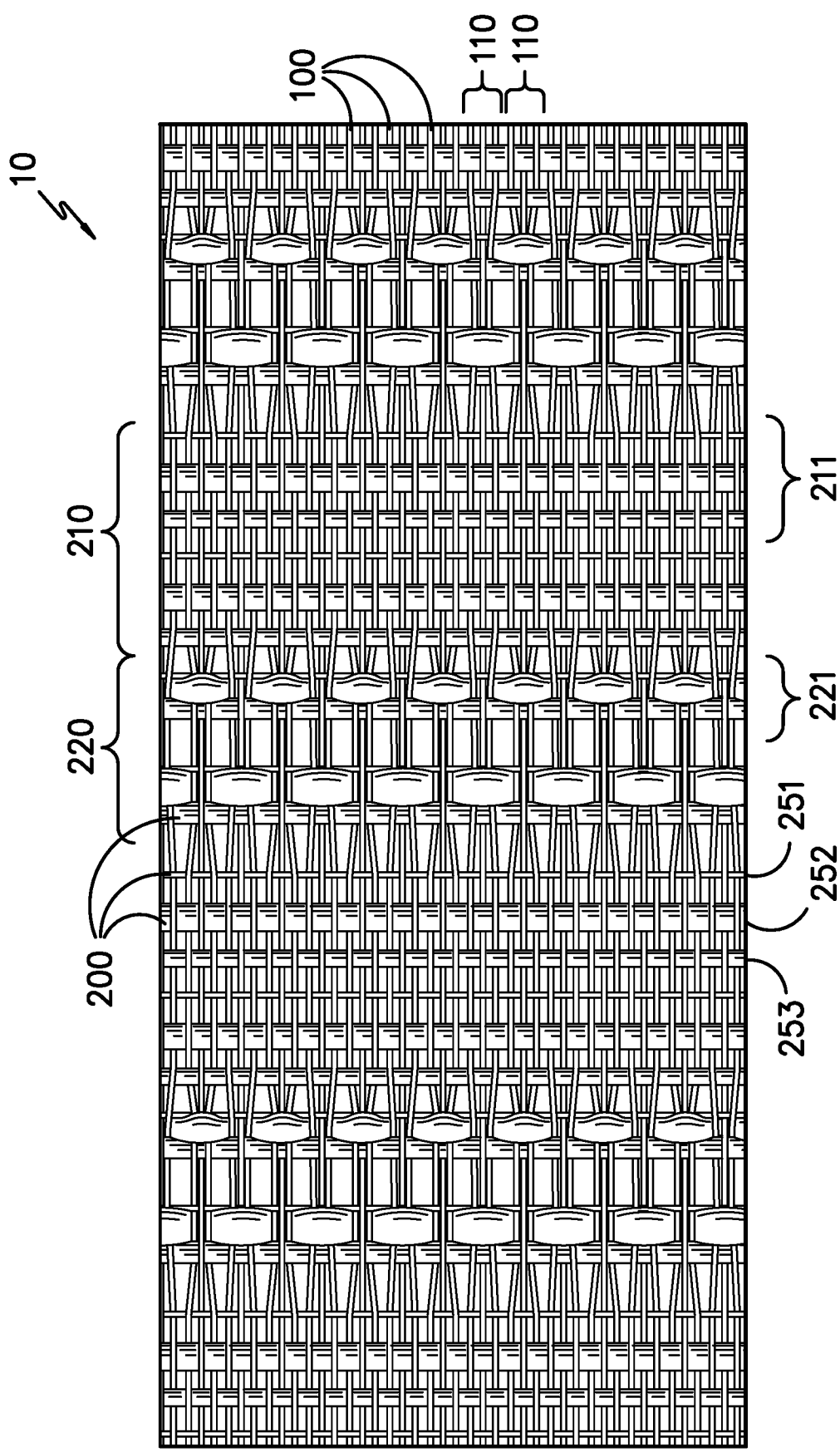
FIG. -1-

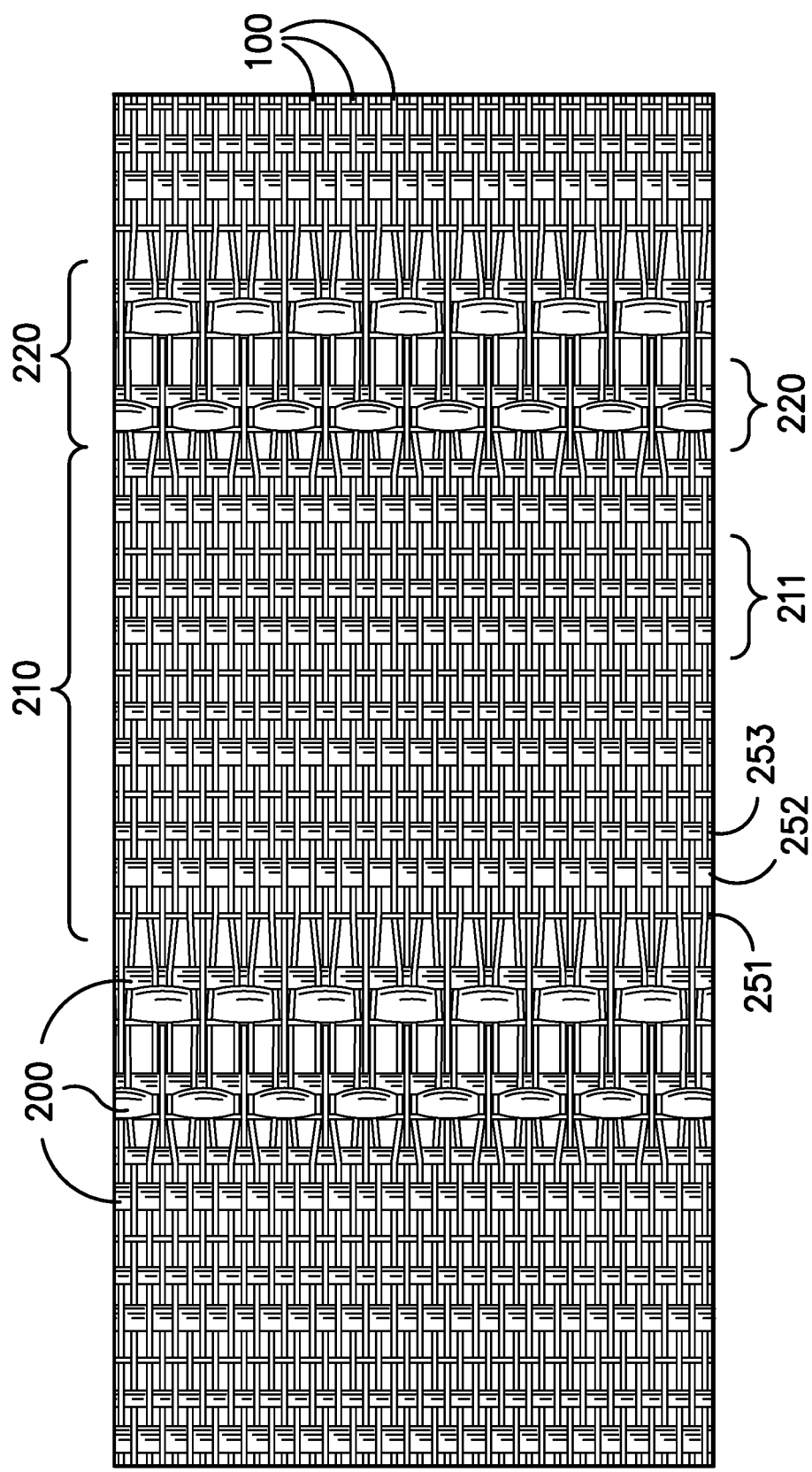
FIG. -2-

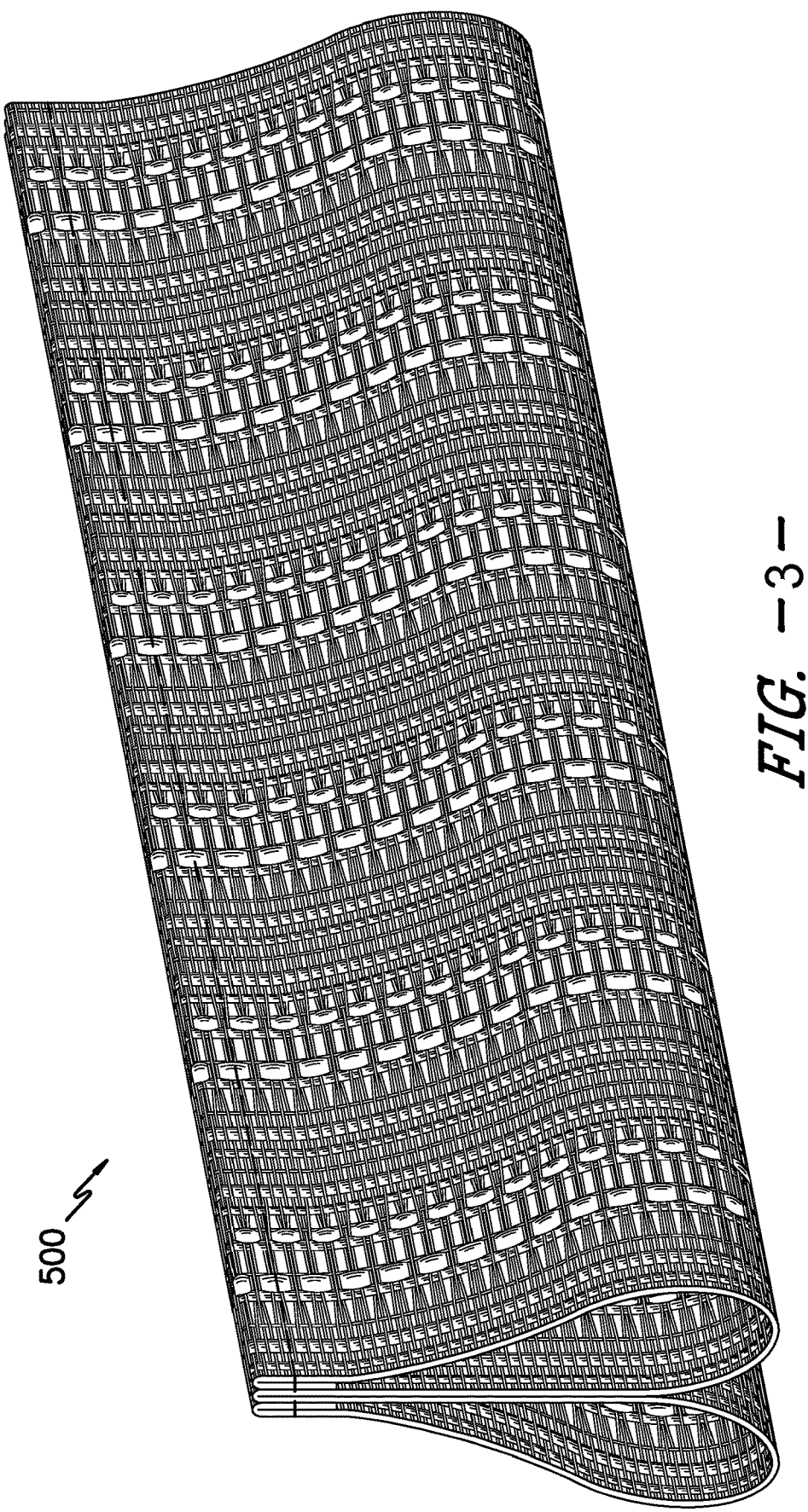
FIG. -3-

PARTIAL FLOAT WEAVE FABRIC

RELATED APPLICATIONS

This application is a continuation of co-pending U.S. patent application Ser. No. 15/586,583, filed on May 4, 2017, which is continuation of U.S. patent application Ser. No. 14/950,778, filed on Nov. 24, 2015, both of which are incorporated herein by reference in their entirety.

TECHNICAL FIELD OF THE INVENTION

The present invention is directed towards woven fabrics having partial float weave zones, more particularly for innerduct structures using woven fabrics having partial float weave zones.

BACKGROUND

Cable, such as fiber optic communication cable, is often provided underground in great lengths, and may even extend for many miles. It is known in the art to bury the cable in the ground so that the area above-ground is not cluttered with the cable and its respective support apparatus. Furthermore, by positioning the cable underground, it is more protected from the weather and other potentially damaging circumstances.

It is also known in the cable art to position the cable within a conduit in order to more fully protect the cable during in-ground installations. The conduit, which is often formed from lengths of polyvinyl chloride tubing or the like, is laid in the ground, after which a rope is placed in the conduit either by blowing or rodding. The rope, in turn, is attached to one of the communication cables. By pulling the rope from one end of the conduit, the cable is drawn through the conduit into position. Once placed within the conduit, the cable is protected from damage which may be caused by weather, water, and the like.

When a conduit is in place, it may be subsequently desired to run a second communications cable at the same location. As such, it would be desirable from a cost and time standpoint to make use of the dead space within an existing conduit, rather than lay a new length of conduit. However, it has been found that it is difficult to merely insert a second cable into a conduit that already contains a first cable. When a rope is blown or "snaked" into a conduit already containing a cable (or when a second cable is "snaked" through a conduit with a pre-laid cable), the rope (or cable) is often impeded by the first cable. In such cases, the rope (or second cable) becomes tangled with, or twisted around, the first cable, causing damage to the cables. Innerduct structures have been made from fabric, though there is a need for an improved fabric innerduct structure.

BRIEF SUMMARY OF THE INVENTION

An innerduct for a cable containing one or more strip-shaped lengths of woven textile fabric configured to create a flexible, longitudinal compartment for enveloping a cable. The woven fabric comprises a plurality warp yarns and a plurality of picks of weft yarns, the weft yarns contain a repeating first weft pattern of at least one monofilament yarn, at least one multiple-inserted multifilament yarn, and optionally at least one single-inserted multifilament yarn. The woven fabric contains an alternating pattern containing first weave zones and partial float weave zones. The warp yarns in the first weave zone pass successively over and under each adjacent weft yarn and at least a portion of the warp yarns in the partial float zone float over some adjacent weft yarns.

A woven fabric containing an alternating pattern containing first weave zones and partial float weave zones. The woven fabric contains a plurality warp yarns arranged into groupings of warp yarns, where each grouping contains between 2 and 10 warp yarns and a plurality of picks of weft yarns. In each first weave zone, the picks of weft yarns contain a repeating first weft pattern of at least one monofilament yarn, at least one multiple-inserted multifilament yarn, and optionally at least one single-inserted multifilament yarn. In each partial float zone, the picks of weft yarns within the partial float weave zone contain a repeating second weft pattern of at least one monofilament yarn, at least one multiple-inserted multifilament yarn, and optionally at least one single-inserted multifilament yarn. Only a portion of the warp yarns within at least a portion of the warp groupings float over 3 weft yarns including floating over at least one multiple-inserted multifilament weft yarn in at least a portion of weft pattern repeats. Outside of the floats, the non-floating warp yarns pass successively over and under alternating picks of weft yarns.

An innerduct for a cable, comprising one or more strip-shaped lengths of the woven textile fabric described above configured to create a flexible, longitudinal compartment for enveloping a cable.

An apparatus comprising a conduit and an innerduct positioned inside the conduit, the innerduct comprising at least one strip-shaped panel of woven textile material described above folded about a centrally located longitudinal axis and adjoined along the longitudinal edge portions to define at least one longitudinal channel that is configured to enclose and carry a cable.

BRIEF DESCRIPTION OF THE DRAWINGS

FIGS. 1 and 2 illustrates different embodiments of the woven fabric.

FIG. 3 illustrates one embodiment of an innerduct structure using the woven fabric.

DETAILED DESCRIPTION

The woven fabric of the invention may be used in any suitable end use, but is particularly suited for innerduct structures.

Referring to FIG. 1, there is shown one embodiment of the woven fabric 10. The woven fabric 10 contains an alternating pattern of first weave zones 210 and partial float weave zones 220. In one embodiment, the woven fabric consists of an alternating pattern of first weave zones 210 and partial float weave zones 220. In another embodiment, the woven fabric 10 contains a pattern comprising first weave zones 210, partial float weave zones 220, and second weave zones. The second weave zones may contain different weave patterns and/or yarns than the first weave zones 210 and the partial float weave zones 220.

The woven fabric has a plurality of warp yarns 100 running the warp direction of the woven fabric 10. The woven fabric also contains a plurality of weft yarns 200 running in a generally perpendicular direction relative to the warp direction of the fabric. The weft yarns 200 are interwoven with the warp yarns 100, where the warp yarns 100 extend in a predefined crossing pattern above and below the weft yarns 200.

The yarns in the woven fabric 10 may be any suitable yarn. The selection of the types, sizes, and comparisons of each of the yarns in the woven fabric contribute the end products of the woven fabric. "Yarn", in this application, as used herein includes a monofilament elongated body, a multifilament elongated body, ribbon, strip, yarn, tape, fiber and the like. The woven fabric 10 may contain one type of yarn or a plurality of any one or combination of the above. The yarns may be of any suitable form such as spun staple yarn, monofilament, or multifilament, single component, bi-component, or multi-component, and have any suitable cross-section shape such as circular, multi-lobal, square or rectangular (tape), and oval.

The textile 100 can be formed from a single plurality or type of yarn (e.g., the fabric can be formed solely from yarns comprising a blend of cellulosic fibers and synthetic fibers, such as polyamide fibers), or the textile can be formed from several pluralities or different types of yarns (e.g., the fabric can be formed from a first plurality of yarns comprising cellulosic fibers and polyamide fibers and a second plurality of yarns comprising an inherent flame resistant fiber). The yarns may be formed of (but are not limited to) cellulosic fibers (such as cotton, rayon, linen, jute, hemp, cellulose acetate, and combinations, mixtures, or blends thereof), polyester fibers (e.g., poly(ethylene terephthalate) fibers, poly(propylene terephthalate) (PET) fibers, poly(trimethylene terephthalate) fibers), poly(butylene terephthalate) fibers, and blends thereof), polyamide fibers (e.g., nylon 6 fibers, nylon 6,6 fibers, nylon 4,6 fibers, and nylon 12 fibers), polyvinyl alcohol fibers, an elastic polyester-polyurethane copolymer (SPANDEX®), flame-resistant meta-aramid (NOMEX®) and combinations, mixtures, or blends thereof. Certain embodiments of the textile of the invention contain yarns comprising inherent flame resistant fibers. As utilized herein, the term "inherent flame resistant fibers" refers to synthetic fibers which, due to the chemical composition of the material from which they are made, exhibit flame resistance without the need for an additional flame retardant treatment. In such embodiments, the inherent flame resistant fibers can be any suitable inherent flame resistant fibers, such as polyoxadiazole fibers, polysulfonamide fibers, poly(benzimidazole) fibers, poly(phenylenesulfide) fibers, meta-aramid fibers, para-aramid fibers, polypyridobisimidazole fibers, polybenzylthiazole fibers, polybenzyloxazole fibers, melamine-formaldehyde polymer fibers, phenol-formaldehyde polymer fibers, oxidized polyacrylonitrile fibers, polyamide-imide fibers and combinations, mixtures, or blends thereof. In certain embodiments, the inherent flame resistant fibers are preferably selected from the group consisting of polyoxadiazole fibers, polysulfonamide fibers, poly(benzimidazole) fibers, poly(phenylenesulfide) fibers, meta-aramid fibers, para-aramid fibers, and combinations, mixtures, or blends thereof.

In a preferred embodiment, the warp yarns are monofilament yarns. Monofilament yarns may be preferred because of their lower amount of crimp in a woven fabric (as compared to a multifilament yarn) and so the monofilament yarns have less elongation as an innerduct would be pulled through a conduit. By way of example, the warp yarns may be selected from polyesters, polyolefins, such as polypropylene, polyethylene and ethylene-propylene copolymers, and polyamides, such as nylon and aramid, e.g. Kevlar®. Yarns having a peak elongation at peak tensile load of 45% or less, preferably 30% or less, are preferred. Monofilament yarns, including bi- and multi-component yarns, have been found to be particularly useful in innerduct applications. These materials have been found to impart desired properties to the woven fabric. In one embodiment, all of the warp yarns are PET monofilament yarns as PET monofilament yarns have a good balance of properties versus cost.

By selecting warp yarns having a relatively low elongation at peak tensile load, it is possible to minimize lengthwise elongation of the innerduct structure during installation of the innerduct in a conduit, thereby avoiding "bunching" of the innerduct. Additionally, the elongation potential in the warp direction of the textile fabric incorporated into an innerduct can be minimized by reducing the warp crimp during the weaving process. For example, the warp crimp may be reduced by increasing the tension on the warp yarns during weaving to achieve a warp crimp of less than 5%, as measured by ASTM D3883—Standard Test Method for Yarn Crimp and Yarn Take-Up in Woven Fabrics. Reducing the warp crimp in the fabric, especially a plain weave fabric, results in an increase in the crimp of the filling yarn, which has the further advantage of increasing the seam strength along the longitudinal edges of the sections of fabric used to construct the innerduct.

In one embodiment, warp yarns having a denier of from 350 to 1,200, preferably 400 to 750, may be employed. The end count (yarns per inch in the warp) typically range from 25 to 75 ends per inch, preferably from 35 to 65 ends per inch. In one embodiment of the invention a plain weave textile fabric having 35 to 65 ends per inch of 400 to 750 denier monofilament polyester warp yarns is provided.

The weft yarns may be any suitable yarn including polyesters, polyolefins, such as polypropylene, polyethylene and ethylene-propylene copolymers, and polyamides, such as nylon and aramid, e.g. Kevlar®, and mixtures thereof. Yarns having a peak elongation at peak tensile load of 45% or less, preferably 30% or less, are preferred.

The terms "pick," "picks," "picks per inch" and "ppi" are intended to refer to (a) one filling yarn carried through a shed formed during the weaving process and interlaced with the warp yarns; and (b) two or more filling yarns carried through a shed during the weaving process, either separately or together, and interlaced with the warp yarns. Thus, for the purposes of determining the picks per inch of a woven textile fabric, multiple-inserted filling yarns are counted as a single pick.

The terms "multiple insertion" and "double insertion" are intended to include (a) multiple filling yarns inserted in the shed of the loom together; (b) multiple filling yarns inserted separately, while the shed of the loom remains the same; and (c) multiple filling yarns inserted separately, where the shed of the looms remains substantially the same, that is, the position of 25% or less of the warp yarns are changed between insertions of the yarns. In one preferred embodiment, at least a portion of the picks of weft yarns are multiple-inserted.

The fabric in the first weave zone 210 may have any suitable weave pattern. In FIG. 1, the warp yarns 100 and weft yarns 200 within the first weave zone 210 are in a plain weave where each weft yarn passes over a warp yarn and thereafter passes under the adjacent warp yarn in a repeating manner across the full width of the fabric 10. Suitable plain weaves include, but are not limited to, ripstop weaves produced by incorporating, at regular intervals, extra yarns or reinforcement yarns in the warp, fill, or both the warp and fill of the textile material during formation. Plain weaves are preferred because give stability and structure to the fabric. If the first weave zone were too small or eliminated completely, then the fabric may be too loose (with the warps and wefts moving relative to one another too easily) and would not be as suitable for an innerduct structure.

Other suitable weave patterns may be used as the weave pattern in the first weave zone 210. The terms "woven" and "interwoven" are meant to include any construction incorporating inter-engaging formation strips. By way of example only, and not limitation, it is contemplated that the weft yarns 200 may pass over two or more adjacent warp yarns 100 before transferring to a position below one or more adjacent warp yarns thereby forming a so-called twill weave. Suitable twill weaves include both warp-faced and fill-faced twill weaves, such as 2/1, 3/1, 3/2, 4/1, 1/2, 1/3, or 1/4 twill weaves. The weave may also be, for example, satin, basket-weave, poplin, jacquard, and crepe weave textiles.

In one embodiment, the first weave zone contains warp yarns 100 that are all the same yarn construction (same type of yarn, construction, and materials). This may be preferred in some embodiments for ease of construction.

In one embodiment, the first weave zone contains picks of weft yarns 200 that are all the same yarn construction (same type of yarn, construction, and materials). This may be preferred in some embodiments for ease of construction.

In another embodiment, the first weave zone 210 contains a repeating pattern of different weft yarns 200. This may be preferred so as to take advantage of the different attributes of different types of yarns. In one embodiment, the weft yarns 200 in the first weave zone 210 contain all monofilament yarns. In another embodiment, the weft yarns 200 in the first weave zone 210 contain all multifilament yarns. In one embodiment, the picks of weft yarns 200 in the first weave zone 210 contain both monofilament and multifilament yarns.

In the weft direction, using a variety of different yarns is preferred to tailor the physical properties of the final fabric and structure. Monofilament yarns have are stiffer than multifilament yarns (keeping the denier and materials the same). Multifilament yarns are more flexible. Using both monofilament and multifilament weft yarns produces a balance between flexibility and stiffness. Incorporating some multifilament yarns (because they are less stiff), also lowers the opening force in an innerduct, the amount of force required to push a cable through the individual cell. Multiple or double-inserted multifilament yarns are preferred as they have a larger denier and therefore the cable "rides" along these ridges in the fabric. Because there is less surface area of the fabric in contact with the cable, the friction decreases and the pulling tension required to pull the cable in will typically be lower.

In one embodiment, the ratio of monofilament picks to multifilament picks (including both single and multiple-inserted) within the entire fabric 10 is between 1:6 to 4:1, more preferably, between 1:1 to 1:4. In another embodiment, the ratio of monofilament picks to multifilament picks (including both single and multiple-inserted) within the first weave zones 210 is between 1:6 to 4:1, more preferably, between 1:1 to 1:4. In one embodiment, the ratio of monofilament picks to multifilament picks (including both single and multiple-inserted) within the partial float zones 220 is between 1:6 to 4:1, more preferably, between 1:1 to 1:4.

In one embodiment, the picks of weft yarns 200 in the first weave zone 210 contain a repeating pattern of at least one monofilament yarn and at least one multiple-inserted multifilament yarn. The pattern also contain additional yarns such as single-inserted multifilament yarns and/or multiple-inserted monofilament yarns. In one embodiment, the picks of weft yarns 200 in the first weave zone 210 contain a repeating pattern of at least one monofilament yarn and at least one single-inserted multifilament yarn.

In one embodiment, the picks of weft yarns 200 in the first weave zone 210 contain an alternating pattern of at least one monofilament yarn followed by at least one multiple-inserted multifilament yarn. In another embodiment, the picks of weft yarns 200 in the first weave zone 210 contain an alternating pattern of at least one multiple-inserted multifilament yarn followed by at least one monofilament yarn. In another embodiment, the picks of weft yarns 200 in the first weave zone 210 contains a repeating pattern containing at least one monofilament yarn, at least one multiple-inserted multifilament yarn, and at least one single-inserted multifilament yarn. In another embodiment, the picks of weft yarns 200 in the first weave zone 210 contains a repeating pattern containing one monofilament yarn, one double-inserted multifilament yarn, and one single-inserted multifilament yarn. In FIG. 1, the picks of weft yarns 200 in the first weave zone 210 have a repeating pattern of one monofilament yarn 251, one double-inserted multifilament yarn 252, and one single-inserted multifilament yarn 253 (though they could also be in any other suitable order). It has been found that the pattern in FIG. 1 is particularly preferred as the balance of monofilament yarns to multifilament yarns and single-inserted yarns to multiple-inserted yarns are optimized for certain end uses and is advantageous for stability, cost, and pulling tension.

In one embodiment, the pattern of weft yarns is the same throughout the entire fabric. This is preferred for ease of manufacture. In another embodiment, the pattern of weft yarns varies from zone to zone with the fabric 10.

The first weave zones may contain any suitable number of repeats from a single repeat to 10 or more repeats. Preferably, the number of repeats of the pattern of weft yarns is between 2 and 6. It has been shown that this range creates a good balance between the zones 210, 220 and good stability in the fabric. In one embodiment, the number of repeats of the weft pick pattern is the same in all of first zones 210 of the fabric. In another embodiment, the number of repeats of the weft pick pattern is the different in at least some of the first zones 210 of the fabric 10. The fabric in FIG. 1 shows an embodiment where there are 2 repeats of the weft pattern in each first zone 210. The fabric in FIG. 2 shows an embodiment where there are 4 repeats of the weft pattern in each first zone 210.

Referring back to FIG. 1, the partial float weave zones 220 contain a repeating pick pattern (wefts) comprising at least one monofilament yarn and at least one multiple-inserted multifilament yarn. Preferably, the multiple-inserted multifilament yarn is a double-inserted multifilament yarn. The pattern may contain, in addition to the at least one monofilament yarn and at least one multiple-inserted multifilament yarn, any other suitable yarn for the pattern. In one embodiment, the partial float weave zone 220 contains an alternating pattern of at least one monofilament yarn followed by at least one multiple-inserted multifilament yarn. In another embodiment, partial float weave zone 220 contains an alternating pattern of at least one multiple-inserted multifilament yarn followed by at least one monofilament yarn. In another embodiment, partial float weave zone 220 contains a repeating pattern containing at least one monofilament yarn, at least one multiple-inserted multifilament yarn, and at least one single-inserted multifilament yarn. In FIG. 1, there is shown a repeating pattern of one monofilament yarn 251, one double-inserted multifilament yarn 252, and one single-inserted multifilament yarn 253. It has been found that this combination and pattern of picks of weft yarns is advantageous for stability, cost, and pulling tension.

The warp yarns 100 of the fabric 10 are arranged into groupings of yarns 110, where each group contains at least 2 yarns and preferably less than 10 yarns. These groupings of yarns 110 are less consequential and cannot be easily distinguished in the first weave zones 210 of the woven fabric 10 in FIG. 1 where the weave pattern is a simple weave (such as a plain or twill weave). The groupings 110 are more easily seen and distinguished in the partial float weave zones 200 as at some of the warp yarns 100 from each warp yarn grouping 110 "float" over some of the picks of weft yarns 200. The number of warp yarns in each grouping 110 may vary in a regular pattern or randomly. Preferably, all of the groupings 110 of warp yarns 100 contain the same number of warp yarns. Preferably the group contains between 2 and 5 wasp yarns, more preferably 3 yarns.

For the warp yarn groupings 110, only a portion (meaning less than the total number of warp yarns within the grouping) of the warp yarns within at least a portion of the grouping float over 3 weft yarns including floating over at least one multiple-inserted multifilament weft yarn in at least one weft yarn repeating pattern within the zone 220. This means that for a grouping of 3 warp yarns, 1 or 2 warp yarns float over 3 weft yarns in at least some of the weft repeats. When the warp yarns float, it causes more warp yarns to be on same side of the fabric during those pick(s). This causes that fabric to form little ridges and it is believed that the cable will ride on these ridges and therefore have less friction drag when pulled into the innerduct (and therefore the cable would require less pulling force). Preferably, within each the grouping, at least 1 (and less than the total number of yarns within the grouping) yarn floats over 3 weft yarns including floating over at least one multiple-inserted multifilament weft yarn in each weft yarn repeating pattern within the zone 220.

In the embodiments shown in FIGS. 1 and 2, there are 3 yarns per warp yarn grouping. One of the warp yarns (the middle of the 3 yarns) floats over 3 weft yarns including the multiple-inserted weft yarns in each weft repeat pattern.

For the non-floating warp yarns within the warp yarn groupings, the non-floating warp yarns form a plain weave where they pass successively over and under alternating picks of weft yarns. This helps hold the yarns (warp and weft) in place in the partial float zones 220.

The partial float weave zones 220 may contain any suitable number of repeats from a single repeat to 10 or more repeats. Preferably, the number of repeats of the pattern of weft yarns is between 2 and 6. It has been shown that this range creates a good balance between the zones 210, 220 and good stability in the fabric. In one embodiment, the number of repeats of the weft pick pattern is the same in all of partial float weave zones 220 of the fabric. In another embodiment, the number of repeats of the weft pick pattern is the different in at least some of the partial float weave zones 220 of the fabric 10. The fabrics in FIGS. 1 and 2 show an embodiment where there are 2 repeats of the weft pattern in each partial float weave zone 220.

The balance between the first weave zones 210 and the partial float zones 220 (and any other optional zones) can control how loose or tight and flexible or stiff the fabric is in the weft direction. In one embodiment, the ratio of picks in the first weave zone 210 to picks in the partial float zone is between about 1:4 to 4:1, more preferably 1:2 to 2:1. In one embodiment, the ratio of picks in the first weave zone 210 to picks in the partial float zone is 1:1 (such as shown in FIG. 1). In another embodiment, the ratio of picks in the first weave zone 210 to picks in the partial float zone is 2:1 (such as shown in FIGS. 2 and 3).

The woven fabric may contain addition zones in the repeating pattern of weave zones. In one embodiment, the woven fabric may contain one addition zones which may be at the beginning, end, or middle of the repeating pattern of weave zones. For example, if the woven fabric contained an additional zone, called the second weave zone the repeating pattern may be any of the following:

. . . first weave zone, second weave zone, partial float weave zone . . .
  . . . first weave zone, partial float weave zone, second weave zone . . .
  . . . second weave zone, first weave zone, partial float weave zone . . .

The woven fabric may contain 3, 4 or more zones in the pattern of zones. The zones may differ in the type of weave construction or in the yarns used within zones.

In one embodiment, the fabric comprises a UV stabilizer. The stabilizer may be compounded or otherwise formed in the yarns, be a coating on the yarns, or a coating on the entire fabric. It is slightly counterintuitive to place a UV stabilizer in a product that goes under the ground in a pipe (in the case of an innerduct such as shown in FIG. 3), but it has been found that prior to installation, rolls of innerduct may sit outside in the elements and sun for up to a year before installation. The UV stabilizer serves to protect the physical properties of the fabric and innerduct until it is installed and protected from UV sources. UV stabilizers include materials that inhibit photoinitiation (e.g., UV absorbers (UVAs) and excited state quenchers), and materials that inhibit the subsequent oxidative processes (e.g., radical scavengers and alkyl hydroperoxide decomposers). Any suitable UV stabilizer may be used, for example, carbon black, titanium dioxide, and hydrobenzophenone.

The innerduct structure is typically constructed from one or more strip-shaped lengths of woven fabric configured to create at least one flexible, longitudinal compartment or channel for enveloping a cable. The strip-shaped lengths of fabric are positioned so that the warp yarns extend along the length of the innerduct and the filling yarns are aligned perpendicular to the length of the innerduct.

The one or more strip-shaped lengths of fabric may be joined together to form one, two, three or more compartments in a single innerduct structure, with each of the compartments extending along the length of the innerduct. The innerduct may be configured from a single, strip-shaped length of fabric, which is folded lengthwise, that is, the filling yarns are folded. Alternatively, the innerduct may be configured from multiple, strip-shaped lengths of fabric, which optionally may be folded lengthwise, depending upon the particular design. The term "configured" includes both the spatial arrangement of the one or more lengths of fabric, as well as the means to affix the length(s) of fabric in the desired spatial orientation. The innerduct may be conveniently affixed in the desired orientation by sewing the one or more strip-shaped lengths of fabric, for example, along one or two seams. Additional methods of affixing the one or more lengths of fabric to construct the innerduct include stapling or riveting the fabric at intervals along the length, ultrasonic welding, or fastening the fabric with a hot melt or solvent based adhesive. The fabric may also be provided with relatively low temperature melting fibers, which can be melted and allowed to cool, thereby fusing the innerduct and preventing the structure from unraveling.

Examples of particular innerduct configurations, which are useful in conjunction with the present invention may be found in various references, including U.S. Pat. Nos. 6,304, 696 B1 and 6,571,833 B1, and US Patent Applications Nos.

2008/0054236 A1 and 2008/0264669 A1. Generally, the configurations fall into two categories, the tear-drop configuration and the shared-wall configuration.

An example of an innerduct having a tear-drop configuration, with two compartments for enveloping a cable, is shown in FIG. 3 and identified as 500. Two strip-shaped lengths of fabric are folded to create two individual compartments. The innerduct is constructed with a common seam, which secures the folds, as well as the cut edges along the length of the fabric, which are folded under, to improve seam strength and reduce friction. The tear-drop shaped innerduct has lobes, opposite the fastened edge, which are formed by folding fabric. The innerduct 500 is installed in a conduit (not shown). Innerduct 500 may also contain pull lines in at least one of the compartments. In another embodiment, the tear drop shape and compartments may be formed from a single fabric that is folded multiple times.

A single innerduct 500 may be used in a conduit or multiple innerducts like the innerduct 500 may be inserted in a conduit, depending on the diameter of the conduit. For example, it is contemplated that three such innerducts can be inserted in a 4" diameter conduit, thus providing nine channels for the insertion of fiber optic cable. By way of example, if the conduit has an inner diameter of 4" and the strip-shaped length of fabric 10 (in the center of innerduct 40) is 3" wide, the width of the narrowest wall is less than the inner diameter of the conduit. This helps to minimize frictional engagement of the innerduct 500 with the conduit when the innerduct is being pulled through the conduit.

To draw the fiber optic, coaxial, or other cables through the innerduct structure, it is desirable to provide pull lines for such purpose. The pull lines are positioned within the compartments of the innerduct, preferably before installation of the innerduct within the conduit. By way of example, the pull lines may be tightly woven, relatively flat strips of material or may be a twisted ropes or multi-ply cords having a substantially round cross-section.

Preferably, the innerduct and the pull line have respective values of elongation percentage which are substantially equal for a given tensile load. If elongation of the innerduct differs substantially from that of a pull line, one of those structures may lag relative to the other when they are pulled together through a conduit during installation, resulting in bunching of the innerduct. The pull lines may be formed of tightly woven, polyester material, which exhibits a tensile strength of between about 400 pounds and about 3,000 pounds.

In one embodiment, the cell is formed from the fabric 10. In one embodiment, the fabric 10 is slit and the edges are sealed using glue, heat, ultrasonic, or other means. In another embodiment, the fabric 10 is narrow woven into a cell configuration. In another embodiment, the fabric 10 is folded onto itself multiple times forming a narrow strip and secured using glue, stitches, ultrasonic, or other means to create a thicker and stronger pull tape. Each individual cell can be either empty or have the addition of a pulling medium such as: pull tape, rope, or other method.

Generally, a conduit is a rigid or semi-rigid piping or duct system for protecting and routing cables, electrical wiring and the like. The term "cable" is intended to include fiber optic cables, electrical wires, coaxial and triaxial cables, as well as any other line for transmitting electricity and/or electromagnetic signals. By way of example, the conduit may be made of metal, synthetic polymer, such as thermoplastic polymer, clay or concrete. The passageway through the conduit may have a round, oval, rectangular or polygonal cross-section. The present invention finds utility in combination with virtually any conduit system. Depending upon the relative size of the passageway in the innerduct, typically calculated as the inside diameter, persons skilled in the art may select from the width of the innerduct, number of compartments in each innerduct, and number of individual innerducts, to maximize the capacity of the conduit.

EXAMPLES

The invention may be further understood with reference to the following examples.

Warp tensile strength was measured according to ASTM D5035 Standard Test Method for Breaking Force and Elongation of Textile Fabrics (Strip Test Method).

Filling tensile strength was measured according to ASTM D5035 Standard Test Method for Breaking Force and Elongation of Textile Fabrics (Strip Test Method).

Filling tear strength was measured according to ASTM D5034 Standard Test Method for Breaking Force and Elongation of Textile Fabrics (Grab Test Method).

Pulling tension was measured according to pounds force, as measured with a digital load cell, required to install two 18 mm OD fiber optic cables into an innerduct having a tear-drop configuration, with two compartments, and a width of 44 mm (corresponding to MaxCell® style 4418-2), located in a 50 mm ID PVC conduit over a distance of 225 meters, with two 90 degree sweep bends.

Seam strength was measured by ASTM D1683 Standard Test Method for Failure in Sewn Seams of Woven Apparel Fabrics.

Example 1

A textile fabric (shown in FIG. 1) having the following characteristics was woven on a Dornier HTVS 4/S 220 cm machine:

Warp: 48 ends per inch of 520d denier PET monofilament yarn;

Filling: 18 picks per inch, in a 3 pick repeat (Total repeat of design is 18)
  (1) 350 denier nylon 6 monofilament yarn;
  (2) double insertion of 681 denier textured PET multifilament yarn (two-ply 300 denier/68 filaments;
  (3) single insertion of 681 denier textured PET multifilament yarn (two-ply 300 denier/68 filaments;

The first weave zones were a plain weave containing 2 full sets of the pick repeat. The warp yarns were organized into groups of three with the inner yarn floating and the outer 2 yarns forming a plain weave stitch. The floating yarn floated over the double-inserted yarns (#2 from above) in each repeat of the pick repeat pattern. The partial float zones contained 2 full sets of the pick repeats. The fabric had a warp tensile of 265 lbs/in and a 4×8 filling tear strength of 192 lb.

Example 2

A textile fabric (shown in FIG. 2) was constructed the same as Example 1, except that the first weave contains 4 full sets of the plain weave zone repeat.

Example 3

A textile fabric having the following characteristics was woven on a Dornier HTVS 4/S 220 cm machine. The multifilament polyester filling yarns were double. The fabric was finished, slit and sewn into a tear-drop configured innerduct structure, as shown in FIG. 3, with two compartments, corresponding to Milliken & Company MaxCell® style 4418-2.

Warp: 48 ends per inch of 520 denier PET monofilament yarn;

Filling: 18 picks per inch, in a six pick repeat (1) 520 denier nylon 6 monofilament yarn; (2) double insertion of 681 denier textured PET multifilament yarn (two-ply 300 denier/68 filaments; (3) double insertion of 681 denier textured PET multifilament yarn (two-ply 300 denier/68 filaments; (4) 350 denier nylon 6 monofilament yarn; (5) double insertion of 681 denier textured PET multifilament yarn (two-ply 300 denier/68 filaments; and (6) double insertion of 681 denier textured PET multifilament yarn (two-ply 300 denier/68 filaments. The weight of the fabric was 5.8 oz per square yard. This fabric is commercially available as MAXCELL™ 4G from Milliken & Company.

Test Results

Each of the textile fabrics of Example 1 and 2 was made into a tear-drop shaped innerduct having substantially the proportions shown in FIG. 2. The performance of the innerducts made from the respective fabrics was tested according to the methods set forth above, and the results are reported in Table 1 below. The pulling tensions are as follows, the initial cable 1 is the pulling tension at the start of the pull (t=0) and the max cable 1 is the maximum puling tension throughout pulling the first cable into the innerduct structure. The initial cable 2 is the pulling tension at the start of the pull (t=0) of a second cell in the innerduct structure and the max cable 2 is the maximum puling tension throughout pulling a second cable into the innerduct structure.

TABLE 1

| Test | Example 1 | Example 2 | Example 3 |
| --- | --- | --- | --- |
| Warp Tensile lb/2" | 552.7 | 544.6 | 554.9 |
| Filling Tensile (lbs) | 159.8 | 192.4 | 230.4 |
| Elongation (max) | 18.7% | 20.0% | 21.3% |
| Elongation (100 lbs) | 2.6% | 3.2% | 4.8% |
| Pulling Tension (lbs) | | | |
| Initial Cable 1 | 35 | 34 | 43 |
| Max Cable 1 | 64 | 52 | 88 |
| Initial Cable 2 | 96 | 85 | 110 |
| Max Cable 2 | 96 | 85 | 110 |

Examples 1 and 2 have improved elongation as compared to Example 3 due the crimp factor as a result of interlacing (the partial float zones have less crimping as compared to a plain weave). Lower elongation should help in hard pulls not to stretch the fabric and "lock down" on the pull tapes. In addition, the float regions in Examples 1 and 2 are believed to create a ridge effect where in theory the cable would have less contact with the fabric and therefore less friction. This should result in reduced pulling tension due to the lower friction property transferred to the cable.

The filling tensile strength of Examples 1 and 2 are lower than in Example 3 because of the replacement of the 520 denier monofilament with a 350 denier monofilament yarn in the weft direction. Additional, 1 of the multifilament yarns were also removed as compared to Example 3. Having lower tensile strength may be preferred as it tends to lower the pulling tension needed to pull a cable through the cell of the innerduct structure.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the subject matter of this application (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the subject matter of the application and does not pose a limitation on the scope of the subject matter unless otherwise claimed. No language in the specification should be construed as indicating any non-claimed element as essential to the practice of the subject matter described herein.

Preferred embodiments of the subject matter of this application are described herein, including the best mode known to the inventors for carrying out the claimed subject matter. Variations of those preferred embodiments may become apparent to those of ordinary skill in the art upon reading the foregoing description. The inventors expect skilled artisans to employ such variations as appropriate, and the inventors intend for the subject matter described herein to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the present disclosure unless otherwise indicated herein or otherwise clearly contradicted by context.

What is claimed is:

1. A woven fabric comprising an alternating pattern containing first weave zones and partial float weave zones, wherein the woven fabric comprises:
   a plurality warp yarns arranged into groupings of warp yarns, wherein each grouping contains between 2 and 10 warp yarns; and,
   a plurality of picks of weft yarns;
   wherein in each first weave zone the picks of weft yarns comprise a repeating first weft pattern of at least one monofilament yarn and at least one single-inserted multifilament yarn, wherein within the first weave zones each warp yarn passes successively over and under alternating picks of weft yarns forming a plain weave,
   wherein in each partial float zone the picks of weft yarns within the partial float weave zone comprise a repeating second weft pattern of at least one monofilament yarn and at least one single-inserted multifilament yarn,
   wherein only a portion of the warp yarns within at least a portion of the warp groupings float over 3 weft yarns including floating over at least one single-inserted multifilament weft yarn in at least a portion of weft pattern repeats, and wherein outside of the floats the non-floating warp yarns pass successively over and under alternating picks of weft yarns.

2. The woven fabric of claim 1, wherein the repeating pattern of the zones in the woven fabric consists of an alternating pattern of first weave zones and partial float weave zones.

3. The woven fabric of claim 1, wherein the repeating pattern of zones comprises first weave zones, partial float weave zones, and second weave zones.

4. The woven fabric of claim 1, wherein the weft yarns in the woven fabric comprise a repeating pattern of at least one monofilament yarn and at least one single-inserted multifilament yarn throughout the entire fabric.

5. The woven fabric of claim 1, wherein the warp yarns are monofilament yarns.

6. The woven fabric of claim 1, wherein at least a portion of the yarns in the woven fabric comprise a UV stabilizer.

7. The woven fabric of claim 1, wherein the woven fabric is a narrow woven tape have a width of less than about 2 inches.

8. An innerduct for a cable comprising one or more strip-shaped lengths of woven textile fabric configured to create a flexible, longitudinal compartment for enveloping a cable, wherein the woven fabric comprises a plurality warp yarns and a plurality of picks of weft yarns, wherein the weft yarns comprise a repeating first weft pattern of at least one monofilament yarn and at least one single-inserted multifilament yarn, wherein the woven fabric comprises an alternating pattern containing first weave zones and partial float weave zones,
 wherein in the first weave zones, the warp yarns pass successively over and under each adjacent weft yarn forming a plain weave,
 wherein in the partial float zones, at least a portion of the warp yarns float over some adjacent weft yarns including floating over at least one single-inserted multifilament weft yarn in at least a portion of first weft pattern repeats, and wherein outside of the floats the non-floating warp yarns pass successively over and under alternating picks of weft yarns.

9. The innerduct of claim 8, wherein the woven fabric comprises an alternating pattern containing first weave zones, second weave zones, partial float weave zones.

10. The woven fabric of claim 8, wherein the repeating pattern of the zones in the woven fabric consists of an alternating pattern of first weave zones and partial float weave zones.

11. The woven fabric of claim 8, wherein the warp yarns are monofilament yarns.

12. The woven fabric of claim 8, wherein at least a portion of the yarns in the woven fabric comprise a UV stabilizer.

13. An innerduct for a cable comprising one or more strip-shaped lengths of woven textile fabric configured to create a flexible, longitudinal compartment for enveloping a cable, wherein the textile fabric comprises:
 a plurality warp yarns arranged into groupings of warp yarns, wherein each grouping contains between 2 and 10 warp yarns; and,
 a plurality of picks of weft yarns;
 wherein in each first weave zone the picks of weft yarns comprise a repeating first weft pattern of at least one monofilament yarn and at least one single-inserted multifilament yarn, wherein within the first weave zones each warp yarn passes successively over and under alternating picks of weft yarns forming a plain weave,
 wherein in each partial float zone the picks of weft yarns within the partial float weave zone comprise a repeating second weft pattern of at least one monofilament yarn and at least one single-inserted multifilament yarn,
 wherein only a portion of the warp yarns within at least a portion of the warp groupings float over 3 weft yarns including floating over at least one single-inserted multifilament weft yarn in at least a portion of weft pattern repeats, and wherein outside of the floats the non-floating warp yarns pass successively over and under alternating picks of weft yarns, and wherein the repeating pattern of the zones in the woven fabric consists of an alternating pattern of first weave zones and partial float weave zones.

14. The woven fabric of claim 13, wherein the weft yarns in the woven fabric comprise a repeating pattern of at least one monofilament yarn and at least one single-inserted multifilament yarn throughout the entire fabric.

15. The woven fabric of claim 13, wherein the warp yarns are monofilament yarns.

16. The woven fabric of claim 13, wherein at least a portion of the yarns in the woven fabric comprise a UV stabilizer.

17. The woven fabric of claim 13, wherein the repeating pattern of the zones in the woven fabric consists of an alternating pattern of first weave zones and partial float weave zones.

18. An apparatus comprising:
 a conduit;
 an innerduct positioned inside the conduit, the innerduct comprising at least one strip-shaped panel of woven textile material folded about a centrally located longitudinal axis and adjoined along the longitudinal edge portions to define at least one longitudinal channel that is configured to enclose and carry a cable, wherein said woven textile material comprises:
 a plurality warp yarns arranged into groupings of warp yarns, wherein each grouping contains between 2 and 10 warp yarns; and,
 a plurality of picks of weft yarns;
 wherein in each first weave zone the picks of weft yarns comprise a repeating first weft pattern of at least one monofilament yarn and at least one single-inserted multifilament yarn, wherein within the first weave zones each warp yarn passes successively over and under alternating picks of weft yarns forming a plain weave,
 wherein in each partial float zone the picks of weft yarns within the partial float weave zone comprise a repeating second weft pattern of at least one monofilament yarn and at least one single-inserted multifilament yarn,
 wherein only a portion of the warp yarns within at least a portion of the warp groupings float over 3 weft yarns including floating over at least one single-inserted multifilament weft yarn in at least a portion of weft pattern repeats, and wherein outside of the floats the non-floating warp yarns pass successively over and under alternating picks of weft yarns.

19. The woven fabric of claim 18, wherein the weft yarns in comprise a repeating pattern of at least one monofilament yarn and at least one single-inserted multifilament yarn throughout the entire fabric.

20. The woven fabric of claim 18, wherein the warp yarns are monofilament yarns.

21. The woven fabric of claim 18, wherein at least a portion of the yarns in the woven fabric comprise a UV stabilizer.

22. The woven fabric of claim 18, wherein the repeating pattern of the zones in the woven fabric consists of an alternating pattern of first weave zones and partial float weave zones.

\* \* \* \* \*